(12) United States Patent
Yang et al.

(10) Patent No.: US 11,889,434 B2
(45) Date of Patent: Jan. 30, 2024

(54) WIRELESS COMMUNICATION SYSTEM USING ONE OR MORE THROUGHPUT ENHANCEMENT TECHNIQUES

(71) Applicant: MEDIATEK INC., Hsin-Chu (TW)

(72) Inventors: Yen-Wen Yang, Hsinchu (TW);
Chen-Feng Liu, Hsinchu (TW);
Ting-Che Tseng, Hsinchu (TW);
Ying-Che Hung, Hsinchu (TW);
Tsai-Yuan Hsu, Hsinchu (TW);
You-Chin Chang, Hsinchu (TW);
Kin-Man Sun, Hsinchu (TW);
Chih-Hsiu Lin, Hsinchu (TW);
Teng-Wei Huang, Hsinchu (TW);
Hung-Chang Tsai, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 119 days.

(21) Appl. No.: 17/015,010

(22) Filed: Sep. 8, 2020

(65) Prior Publication Data
US 2021/0092694 A1    Mar. 25, 2021

Related U.S. Application Data

(60) Provisional application No. 62/961,929, filed on Jan. 16, 2020, provisional application No. 62/903,980, filed on Sep. 23, 2019.

(51) Int. Cl.
*H04W 52/52* (2009.01)
*H04W 52/24* (2009.01)
(Continued)

(52) U.S. Cl.
CPC ............. *H04W 52/52* (2013.01); *H04W 4/80* (2018.02); *H04W 52/143* (2013.01); *H04W 52/243* (2013.01); *H04W 84/12* (2013.01)

(58) Field of Classification Search
CPC ... H04W 4/80; H04W 52/143; H04W 52/226; H04W 52/241; H04W 52/243;
(Continued)

(56) References Cited

U.S. PATENT DOCUMENTS

| 6,678,765 | B1 * | 1/2004 | Moscovici | ............ | G06F 13/126 |
| | | | | | 710/72 |
| 7,724,846 | B2 * | 5/2010 | Abraham | ............. | H04B 7/1851 |
| | | | | | 375/348 |

(Continued)

FOREIGN PATENT DOCUMENTS

| CN | 102106174 A * | 6/2011 | ............ H04W 52/08 |
| JP | WO2020012591 A1 * | 1/2020 | |

(Continued)

*Primary Examiner* — Jay P Patel
(74) *Attorney, Agent, or Firm* — Winston Hsu

(57) ABSTRACT

A wireless communication includes a control circuit and a receiver (RX) circuit. The control circuit obtains indicator information from another wireless communication system, identifies a transmitter (TX) and receiver (RX) packet delivery scenario as one of a packet overlapping scenario and a packet non-overlapping scenario according to the indicator information, and generates RX gain control information in response to the TX and RX packet delivery scenario. The RX circuit refers to the RX gain control information to set an RX gain used for receiving data.

21 Claims, 11 Drawing Sheets

(51) Int. Cl.
*H04W 4/80* (2018.01)
*H04W 52/14* (2009.01)
*H04W 84/12* (2009.01)

(58) Field of Classification Search
CPC ..... H04W 52/52; H04W 84/12; H04W 88/06; H04W 16/14; H04W 72/082; H04W 72/1215; H04W 24/10; H04W 36/20; H04W 24/08; H04W 36/06; H04W 4/00; H04W 72/0413; H04W 88/10; H04W 36/0058; H04W 36/0083; H04W 36/0085; H04W 36/14; H04W 48/08; H04W 72/0406; H04W 72/1289; H04W 16/10; H04W 24/02; H04W 28/06; H04B 1/1027; H04B 15/00; H04B 2215/062
See application file for complete search history.

(56) References Cited

U.S. PATENT DOCUMENTS

| | | | | |
|---|---|---|---|---|
| 7,898,975 B2* | 3/2011 | Shi | | H04B 3/487 370/252 |
| 8,805,303 B2* | 8/2014 | Koo | | H04W 88/06 370/328 |
| 8,831,611 B2* | 9/2014 | Koo | | H04W 36/0085 370/328 |
| 9,055,497 B2* | 6/2015 | Koo | | H04W 36/20 |
| 9,161,343 B2* | 10/2015 | Koo | | H04W 72/1215 |
| 9,900,895 B2* | 2/2018 | Koo | | H04W 72/082 |
| 10,069,521 B1* | 9/2018 | Farjadrad | | H04B 1/0458 |
| 11,101,844 B2* | 8/2021 | Oksman | | H04B 3/32 |
| 2002/0129379 A1* | 9/2002 | Levinson | | H04N 7/17309 725/127 |
| 2004/0219959 A1* | 11/2004 | Khayrallah | | H04B 7/0877 455/574 |
| 2005/0152465 A1* | 7/2005 | Maltsev | | H04L 5/006 375/260 |
| 2008/0146241 A1* | 6/2008 | Das | | H04L 1/0017 455/450 |
| 2009/0176454 A1* | 7/2009 | Chen | | H04B 15/00 455/63.1 |
| 2010/0197235 A1* | 8/2010 | Wilhelmsson | | H04W 72/02 455/63.3 |
| 2011/0194506 A1* | 8/2011 | Hirsch | | H04W 72/1257 370/329 |
| 2012/0213116 A1* | 8/2012 | Koo | | H04W 88/06 370/253 |
| 2013/0201884 A1* | 8/2013 | Freda | | H04W 74/0833 370/278 |
| 2013/0215850 A1* | 8/2013 | Zakrzewski | | H04W 4/70 370/329 |
| 2014/0141825 A1* | 5/2014 | Koo | | H04W 48/08 455/501 |
| 2014/0198672 A1* | 7/2014 | Koo | | H04W 72/1215 370/252 |
| 2014/0301361 A1* | 10/2014 | Koo | | H04W 36/20 370/329 |
| 2015/0133185 A1* | 5/2015 | Chen | | H04W 72/1215 455/552.1 |
| 2015/0237639 A1* | 8/2015 | Garrett | | H04L 1/0003 370/329 |
| 2016/0252620 A1* | 9/2016 | Surinder | | G01S 19/22 342/357.61 |
| 2016/0336984 A1* | 11/2016 | Demay | | H04B 1/525 |
| 2016/0345331 A1* | 11/2016 | Seyama | | H04W 52/243 |
| 2017/0011753 A1* | 1/2017 | Herbig | | G10L 21/0232 |
| 2017/0295044 A1 | 10/2017 | Oksman | | |
| 2018/0205467 A1* | 7/2018 | Lee | | H03F 1/56 |
| 2019/0245726 A1* | 8/2019 | Boudreau | | H04L 27/26025 |
| 2020/0176012 A1* | 6/2020 | Herbig | | G10L 21/034 |
| 2021/0320708 A1* | 10/2021 | He | | H04B 17/318 |

FOREIGN PATENT DOCUMENTS

| | | |
|---|---|---|
| TW | 201240372 A1 | 10/2012 |
| TW | 201832483 A | 9/2018 |

* cited by examiner

WIRELESS COMMUNICATION SYSTEM USING ONE OR MORE THROUGHPUT ENHANCEMENT TECHNIQUES

CROSS REFERENCE TO RELATED APPLICATIONS

This application claims the benefit of U.S. provisional application No. 62/903,980 filed Sep. 23, 2019 and U.S. provisional application No. 62/961,929 filed Jan. 16, 2020. The entire contents of the related applications, including U.S. provisional application No. 62/903,980 and U.S. provisional application No. 62/961,929, are incorporated herein by reference.

BACKGROUND

The present invention relates to wireless communications, and more particularly, to a wireless communication system using one or more throughput enhancement techniques.

It has become a desired feature that a mobile phone includes multiple wireless communication systems. For example, a user may make a phone call through a cellular system, access the Internet through a wireless fidelity (WiFi) system, and connect a portable handset (earphone) through a Bluetooth (BT) system. In some applications, one would like to access these heterogenous systems simultaneously, which unfortunately causes inter-radio interference. This is because operation channels of different wireless communication systems are close to one another, and the coexistence of different types of radio transceivers will result in adjacent channel interference. The in-device coexistence interference problem causes receiver performance degradation. A typical time-division duplexing (TDD) solution can avoid coexistence interference but has lower throughput. A typical frequency-division duplexing (FDD) solution, however, is unable to avoid coexistence interference. Thus, there is a need for an innovative FDD solution that can mitigate the coexistence interference to get more throughput.

SUMMARY

One of the objectives of the claimed invention is to provide a wireless communication system using one or more throughput enhancement techniques.

According to a first aspect of the present invention, an exemplary wireless communication system is disclosed. The exemplary wireless communication system includes a control circuit and a receiver (RX) circuit. The control circuit is arranged to obtain indicator information from another wireless communication system, identify a transmitter (TX) and receiver (RX) packet delivery scenario as one of a packet overlapping scenario and a packet non-overlapping scenario according to the indicator information, and generate RX gain control information in response to the TX and RX packet delivery scenario. The RX circuit is arranged to refer to the RX gain control information to set an RX gain used for receiving data.

According to a second aspect of the present invention, an exemplary wireless communication system is disclosed. The exemplary wireless communication system includes a control circuit and a transmitter (TX) circuit. The control circuit is arranged to identify a transmitter (TX) and receiver (RX) packet delivery scenario as one of a packet overlapping scenario and a packet non-overlapping scenario, and determine TX power control information in response to the TX and RX packet delivery scenario. The TX circuit is arranged to refer to the TX power control information to set TX power used for transmitting data.

According to a third aspect of the present invention, an exemplary wireless communication system is disclosed. The exemplary wireless communication system includes a buffer device, a transmitter (TX) circuit, and a control circuit. The control circuit is arranged to aggregate a plurality of transmission data units in the buffer device, and instruct the TX circuit to transmit the transmission data units in a continuous period, wherein the continuous period overlaps a duration in which another wireless communication system receives data.

According to a fourth aspect of the present invention, an exemplary wireless communication system is disclosed. The exemplary wireless communication system includes a wireless communication circuit and a control circuit. The wireless communication circuit includes an adjustable filter circuit. The control circuit is arranged to configure the adjustable filter circuit to have a first filter response when a first channel employed by the wireless communication circuit of the wireless communication system and a second channel employed by another wireless communication system have a first channel arrangement, and configure the adjustable filter circuit to have a second filter response when the first channel employed by the wireless communication circuit of the wireless communication system and the second channel employed by said another wireless communication system have a second channel arrangement. One of the first channel and the second channel is a transmitter (TX) channel, and another of the first channel and the second channel is a receiver (RX) channel.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
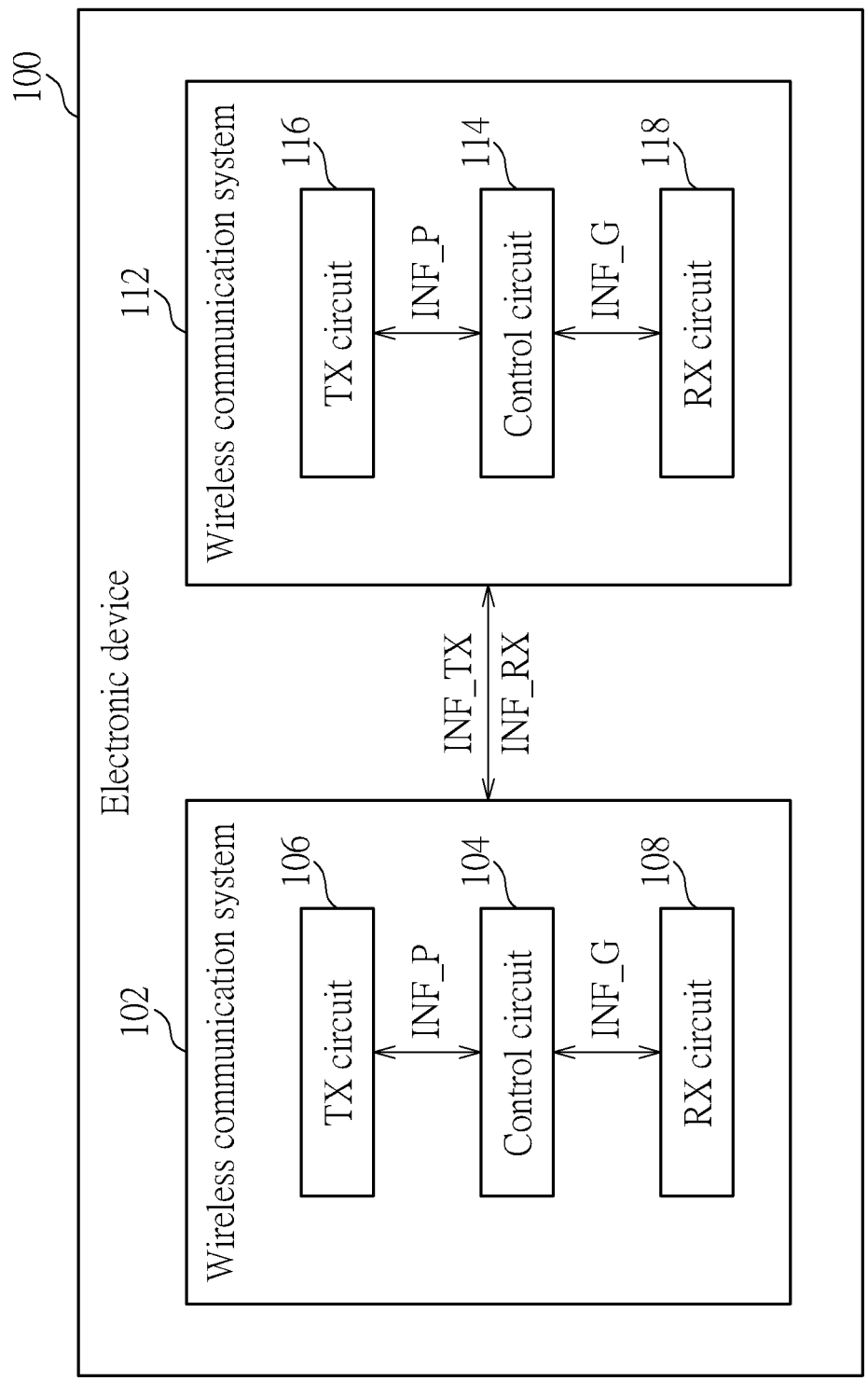
FIG. 1 is a diagram illustrating a first electronic device with coexistence of multiple wireless communication systems according to an embodiment of the present invention.

FIG. 1 is a diagram illustrating a first electronic device with coexistence of multiple wireless communication systems according to an embodiment of the present invention. For example, the electronic device 100 may be a mobile device such as a cellular phone. As shown in FIG. 1, the electronic device 100 includes wireless communication systems 102 and 112 that employ different wireless communication technologies. For example, the wireless communication system 102 may be one of a Long-Term Evolution (LTE) system, a New Radio (NR) system, a Wireless Fidelity (WiFi) system, a ZigBee system, and a Bluetooth (BT) system; and the wireless communication system 112 may be another of the LTE system, the NR system, the WiFi system, the ZigBee system, and the BT system. The wireless communication system 102 includes a control circuit 104 and a plurality of wireless communication circuits including a transmitter (TX) circuit 106 and a receiver (RX) circuit 108. The wireless communication system 112 includes a control circuit 114 and a plurality of wireless communication circuits including a TX circuit 116 and an RX circuit 118.

In accordance with a first throughput enhancement technique proposed by the present invention, the TX power and/or the RX gain can be reduced within a duration in which one of the wireless communication systems 102 and 112 transmits data and another of the wireless communication systems 102 and 112 receives data, where the wireless communication systems 102 and 112 operate under an FDD mode. For example, the first throughput enhancement technique provides per-packet (or per-slot) TX power adjustment for dynamically adjusting the TX power, and/or per-packet (or per-slot) RX gain adjustment for dynamically adjusting the RX gain.

In a first exemplary design, the control circuit 104 of the wireless communication system 102 is arranged to obtain indicator information INF_TX provided from the control circuit 114 of the wireless communication system 112, identify a transmitter (TX) and receiver (RX) packet delivery scenario as one of a packet overlapping scenario and a packet non-overlapping scenario according to the indicator information INF_TX, and generate RX gain control information INF_G in response to the TX and RX packet delivery scenario; and the RX circuit 108 is arranged to refer to the RX gain control information INF_G to set an RX gain used for receiving data. For example, the indicator information INF_TX may include a start time of a duration in which the TX circuit 116 performs data transmission of TX packet. The control circuit 104 may refer to the TX start time to determine if a duration in which the RX circuit 108 performs data reception of RX packet overlaps the duration in which the TX circuit 116 performs data transmission of TX packet.

Figure 10:
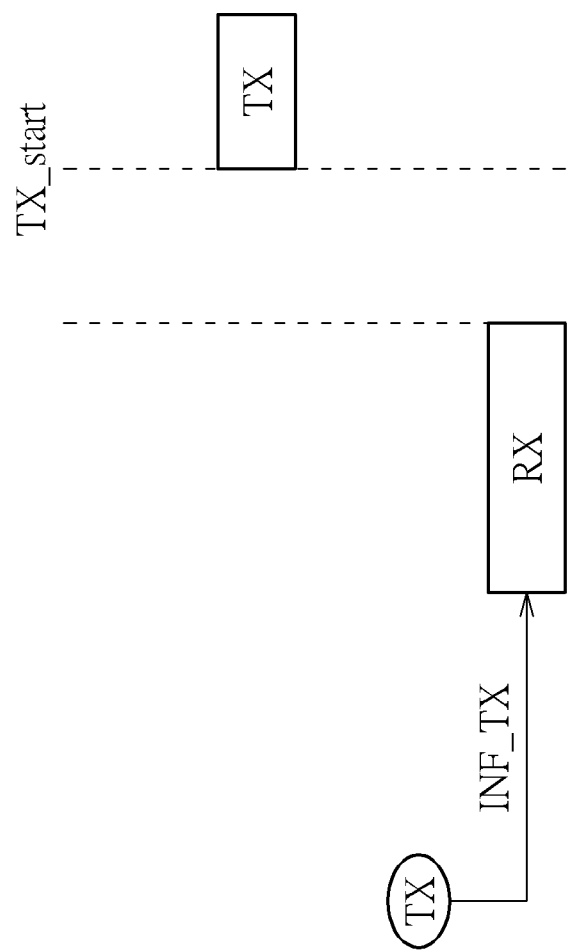
FIG. 10 is a diagram illustrating a packet non-overlapping scenario according to an embodiment of the present invention.

In a case where the duration in which the RX circuit 108 performs data reception of RX packet does not overlap the duration in which the TX circuit 116 performs data transmission of TX packet, the control circuit 104 identifies the TX and RX packet delivery scenario as a packet non-overlapping scenario, and sets the RX gain control information INF_G that does not apply RX gain reduction to the RX circuit 108 under the packet non-overlapping scenario. FIG. 10 is a diagram illustrating a packet non-overlapping scenario according to an embodiment of the present invention. The indicator information INF_TX may include a start time TX_start of a duration in which the TX circuit performs data transmission of TX packet. Hence, the RX side knows that there is no TX/RX packet overlapping, and does not enable RX gain reduction.

Figure 11:
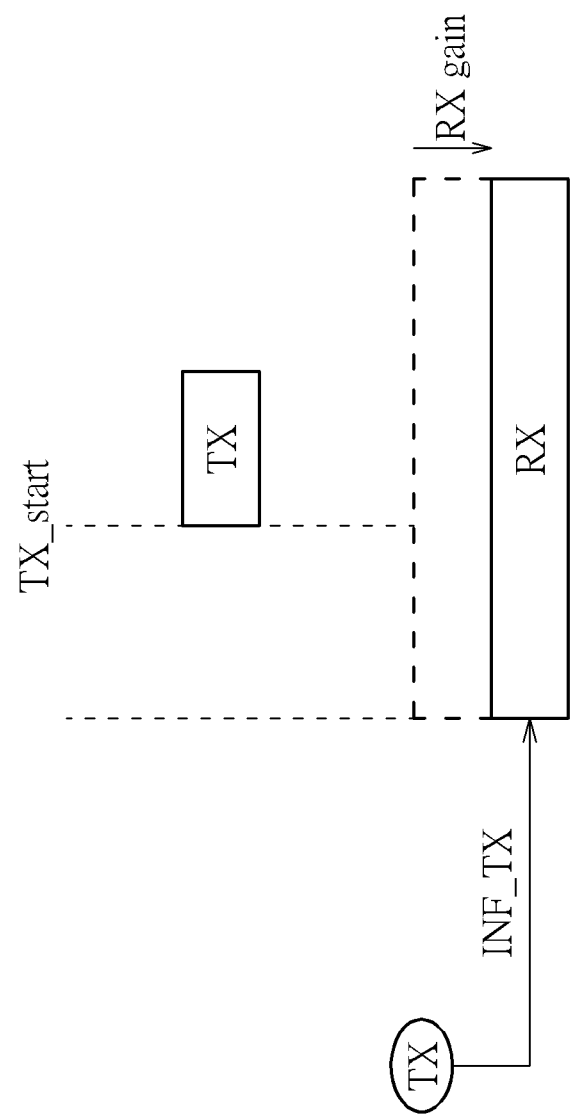
FIG. 11 is a diagram illustrating a packet overlapping scenario with RX gain reduction according to an embodiment of the present invention.

In another case where the duration in which the RX circuit 108 performs data reception of RX packet overlaps the duration in which the TX circuit 116 performs data transmission of TX packet, the control circuit 104 identifies the TX and RX packet delivery scenario as a packet overlapping scenario, and sets the RX gain control information INF_G for applying RX gain reduction to the RX circuit 108. FIG. 11 is a diagram illustrating a packet overlapping scenario with RX gain reduction according to an embodiment of the present invention. The indicator information INF_TX may include a start time TX_start of a duration in which the TX circuit performs data transmission of TX packet. Hence, the RX side knows that there is TX/RX packet overlapping, and enables RX gain reduction. For example, in accordance with the packet overlapping scenario under FDD, the RX circuit 108 may employ an RX gain with a first gain value for receiving data during a first period, and may employ the RX gain with a second gain value for receiving data during a second period, where the second gain value is smaller than the first gain value, the first period does not overlap any duration in which the TX circuit 116 of the wireless communication system 112 transmits data, and the second period overlaps a duration in which the TX circuit 116 of the wireless communication system 112 transmits data.

Hence, the RX gain is not reduced within a non-overlapping duration in which there is no in-device coexistence interference, and is reduced within an overlapping duration in which there is in-device coexistence interference. The RX gain is generally provided by a low noise amplifier (LNA). Because higher gain typically comes with lower linearity, the receiver sensitivity can get worse with interference. In other words, too much gain degrades linearity performance, which leads to sensitivity degradation under strong interference. The first throughput enhancement technique proposes reducing the RX gain within the overlapping duration in which data transmission of one wireless communication system and data reception of another wireless communication system occur. In this way, the RX throughput can be enhanced under FDD.

In this exemplary design, before a start time of the duration in which the TX circuit 116 performs data transmission and the RX circuit 108 performs data reception, the control circuit 114 of the wireless communication system 112 provides the indicator information INF_TX, and the control circuit 104 of the wireless communication system 102 obtains the indicator information INF_TX, where the indicator information INF_TX may include a TX power, a channel, a bandwidth, and a data arriving time (i.e., transmission timing). The TX power is indicative of the interference power. The channel and the bandwidth are indicative of the interference frequency range. The data arriving time (i.e., transmission timing) is indicative of the interference start time.

In a second exemplary design, the control circuit 104 of the wireless communication system 102 is arranged to obtain indicator information INF_TX provided from the control circuit 114 of the wireless communication system 112, identify a TX and RX packet delivery scenario as one of a packet overlapping scenario and a packet non-overlapping scenario according to the indicator information INF_TX, and generate RX gain control information INF_G in response to the TX and RX packet delivery scenario; and the RX circuit 108 is arranged to refer to the RX gain control information INF_G to set an RX gain used for receiving data. For example, the indicator information INF_TX may include a start time of a duration in which the TX circuit 116 performs data transmission of TX packet. The control circuit 104 may refer to the TX start time to determine if a duration in which the RX circuit 108 performs data reception of RX packet overlaps the duration in which the TX circuit 116 performs data transmission of TX packet. In addition, based on the TX and RX packet delivery scenario, the control circuit 104 may selectively generate and output indicator information INF_RX at the time the RX circuit 108 starts to perform data reception of RX packet. For example, the indicator information INF_RX may indicate that the RX circuit 108 is performing data reception of RX packet.

In a case where the duration in which the RX circuit 108 performs data reception of RX packet does not overlap the duration in which the TX circuit 116 performs data transmission of TX packet, the control circuit 104 identifies the TX and RX packet delivery scenario as a packet non-overlapping scenario, sets the RX gain control information INF_G that does not apply RX gain reduction to the RX circuit 108 under the packet non-overlapping scenario, and does not generate and output the indicator information INF_RX to the wireless communication system 112. As illustrated in FIG. 10, the TX side transmits the indicator information INF_TX to the RX side, but the RX side does not the indicator information INF_RX to the TX side. Since the control circuit 114 does not receive the indicator information INF_RX, the control circuit 114 sets the TX power control information INF_P that does not apply TX power reduction to the TX circuit 116 under the packet non-overlapping scenario.

Figure 12:
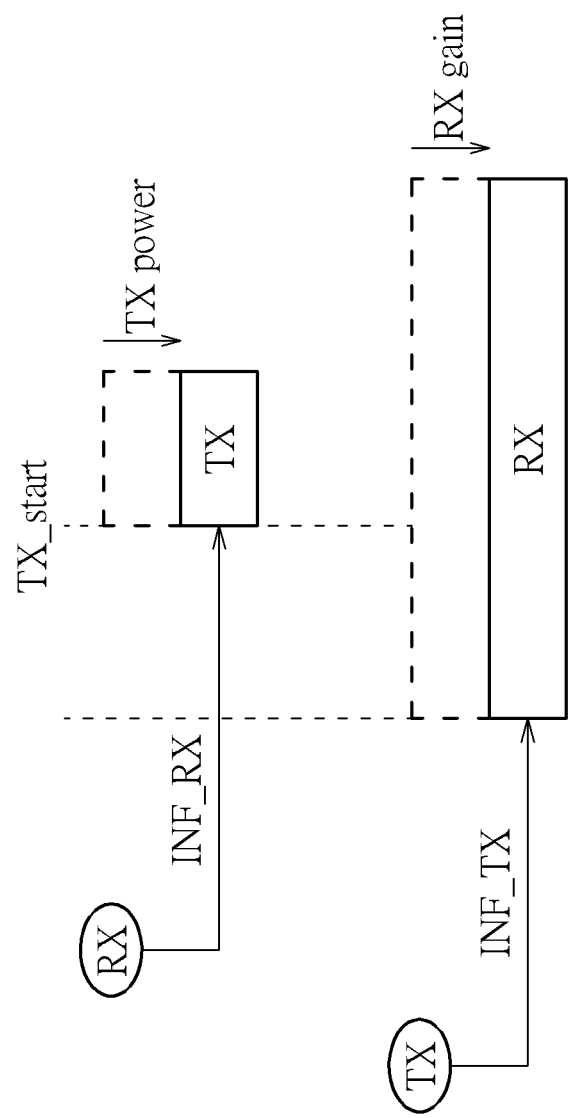
FIG. 12 is a diagram illustrating a packet overlapping scenario with RX gain reduction and TX power reduction according to an embodiment of the present invention.

In another case where the duration in which the RX circuit 108 performs data reception of RX packet overlaps the duration in which the TX circuit 116 performs data transmission of TX packet, the control circuit 104 identifies the TX and RX packet delivery scenario as a packet overlapping scenario, sets the RX gain control information INF_G for applying RX gain reduction to the RX circuit 108, and generates and outputs the indicator information INF_RX to the wireless communication system 112. The control circuit 114 may refer to the RX time indicated by the indicator information INF_RX to determine if the duration in which the TX circuit 116 performs data transmission of TX packet overlaps the duration in which the RX circuit 108 performs data reception of RX packet. Hence, the control circuit 114 identifies the TX and RX packet delivery scenario as a packet overlapping scenario. FIG. 12 is a diagram illustrating a packet overlapping scenario with RX gain reduction and TX power reduction according to an embodiment of the present invention. The indicator information INF_TX may include a start time TX_start of a duration in which the TX circuit performs data transmission of TX packet, and the indicator information INF_RX may indicate that the RX side is receiving RX packet. Hence, the RX side knows that there is TX/RX packet overlapping, and enables RX gain reduction. In addition, the TX side knows that there is TX/RX packet overlapping, and enables TX power reduction.

For example, in accordance with the packet overlapping scenario under FDD, the RX circuit 108 may employ an RX gain with a first gain value for receiving data during a first period, and may employ the RX gain with a second gain value for receiving data during a second period, wherein the second gain value is smaller than the first gain value, the first period does not overlap any duration in which the TX circuit 116 of the wireless communication system 112 transmits data, and the second period overlaps a duration in which the TX circuit 116 of the wireless communication system 112 transmits data.

In addition, in accordance with the packet overlapping scenario under FDD, the control circuit 114 of the wireless communication system 112 may obtain the TX power control information INF_P (which is indicative of expected TX power) from the indicator information INF_RX provided by the wireless communication system 102. In accordance with the packet overlapping scenario under FDD, the TX circuit 116 of the wireless communication system 112 may employ TX power with a first power value for transmitting data during the first period, and may employ the TX power with a second power value (e.g., expected TX power) for transmitting data during the second period, wherein the second power value is smaller than the first power value.

Hence, none of RX gain and TX power is reduced within a non-overlapping duration in which there is no in-device coexistence interference, and both of RX gain and TX power are reduced within an overlapping duration in which there is in-device coexistence interference. The RX gain is generally provided by a low noise amplifier (LNA). The TX power is generated provided by a power amplifier (PA). Because higher gain typically comes with lower linearity, the receiver sensitivity can get worse with interference. In other words, too much gain degrades linearity performance, which leads to sensitivity degradation under strong interference. Furthermore, the higher is the TX power, the interference power is higher. The first throughput enhancement technique proposes reducing the RX gain and the TX power within the overlapping duration in which data transmission of one wireless communication system and data reception of another wireless communication system occur. In this way, the RX throughput can be enhanced under FDD.

In this exemplary design, before a start time of the duration in which the TX circuit 116 performs data transmission and the RX circuit 108 performs data reception, the control circuit 114 of the wireless communication system 112 provides the indicator information INF_TX, and the control circuit 104 of the wireless communication system 102 obtains the indicator information INF_TX, where the indicator information INF_TX may include a TX power, a channel, a bandwidth, and a data arriving time (i.e., transmission timing).

Both of the wireless communication systems 102 and 112 may support the same throughput enhancement technique. In a third exemplary design, the control circuit 114 of the wireless communication system 112 is arranged to obtain indicator information INF_TX provided from the control circuit 104 of the wireless communication system 102, identify a transmitter (TX) and receiver (RX) packet delivery scenario as one of a packet overlapping scenario and a packet non-overlapping scenario according to the indicator information INF_TX, and generate RX gain control information INF_G in response to the TX and RX packet delivery scenario; and the RX circuit 118 is arranged to refer to the RX gain control information INF_G to set an RX gain used for receiving data.

For example, the indicator information INF_TX may include a start time of a duration in which the TX circuit 106 performs data transmission of TX packet. The control circuit 114 may refer to the TX start time to determine if a duration in which the RX circuit 118 performs data reception of RX packet overlaps the duration in which the TX circuit 106 performs data transmission of TX packet.

In a case where the duration in which the RX circuit 118 performs data reception of RX packet does not overlap the duration in which the TX circuit 106 performs data transmission of TX packet, the control circuit 114 identifies the TX and RX packet delivery scenario as a packet non-overlapping scenario, and sets the RX gain control information INF_G that does not apply RX gain reduction to the RX circuit 118 under the packet non-overlapping scenario, as illustrated in FIG. 10.

In another case where the duration in which the RX circuit 118 performs data reception of RX packet overlaps the duration in which the TX circuit 106 performs data transmission of TX packet, the control circuit 114 identifies the TX and RX packet delivery scenario as a packet overlapping scenario, and sets the RX gain control information INF_G for applying RX gain reduction to the RX circuit 118, as illustrated in FIG. 11.

For example, in accordance with the packet overlapping scenario under FDD, the RX circuit may employ an RX gain with a first gain value for receiving data during a first period, and may employ the RX gain with a second gain value for receiving data during a second period, where the second gain value is smaller than the first gain value, the first period does not overlap any duration in which the TX circuit 106 of the wireless communication system 102 transmits data, and the second period overlaps a duration in which the TX circuit 106 of the wireless communication system 102 transmits data. Hence, the RX gain is not reduced within a non-overlapping duration in which there is no in-device coexistence interference, and is reduced within an overlapping duration in which there is in-device coexistence interference. In this way, the RX throughput can be enhanced under FDD.

In this exemplary design, before a start time of the duration in which the TX circuit 106 performs data transmission and the RX circuit 118 performs data reception, the control circuit 104 of the wireless communication system 102 provides the indicator information INF_TX, and the control circuit 114 of the wireless communication system 112 obtains the indicator information INF_TX, where the indicator information INF_TX may include a TX power, a channel, a bandwidth, and a data arriving time (i.e., transmission timing).

In a fourth exemplary design, the control circuit 114 of the wireless communication system 112 is arranged to obtain indicator information INF_TX provided from the control circuit 104 of the wireless communication system 102, identify a TX and RX packet delivery scenario as one of a packet overlapping scenario and a packet non-overlapping scenario according to the indicator information INF_TX, and generate RX gain control information INF_G in response to the TX and RX packet delivery scenario; and the RX circuit 118 is arranged to refer to the RX gain control information INF_G to set an RX gain used for receiving data.

For example, the indicator information INF_TX may include a start time of a duration in which the TX circuit 106 performs data transmission of TX packet. The control circuit 114 may refer to the TX start time to determine if a duration in which the RX circuit 118 performs data reception of RX packet overlaps the duration in which the TX circuit 106 performs data transmission of TX packet. In addition, based on the TX and RX packet delivery scenario, the control circuit 114 may selectively generate and output indicator information INF_RX at the time the RX circuit 118 starts to perform data reception of RX packet. For example, the indicator information INF_RX may indicate that the RX circuit 118 is performing data reception of RX packet.

In a case where the duration in which the RX circuit 118 performs data reception of RX packet does not overlap the duration in which the TX circuit 106 performs data transmission of TX packet, the control circuit 114 identifies the TX and RX packet delivery scenario as a packet non-overlapping scenario, sets the RX gain control information INF_G that does not apply RX gain reduction to the RX circuit 108 under the packet non-overlapping scenario, and does not generate and output the indicator information INF_RX to the wireless communication system 102, as illustrated in FIG. 10. Since the control circuit 104 does not receive the indicator information INF_RX, the control circuit 104 sets the TX power control information INF_P that does not apply TX power reduction to the TX circuit 106 under the packet non-overlapping scenario, as illustrated in FIG. 10.

In another case where the duration in which the RX circuit 118 performs data reception of RX packet overlaps the duration in which the TX circuit 106 performs data transmission of TX packet, the control circuit 114 identifies the TX and RX packet delivery scenario as a packet overlapping scenario, sets the RX gain control information INF_G for applying RX gain reduction to the RX circuit 118 under the packet overlapping scenario, and generates and outputs the indicator information INF_RX to the wireless communication system 102, as illustrated in FIG. 12. The control circuit 104 may refer to the RX time indicated by the indicator information INF_RX to determine if the duration in which the TX circuit 106 performs data transmission of TX packet overlaps the duration in which the RX circuit 118 performs data reception of RX packet. Hence, the control circuit 104 identifies the TX and RX packet delivery scenario as a packet overlapping scenario, as illustrated in FIG. 12.

For example, in accordance with the packet overlapping scenario under FDD, the RX circuit 118 may employ an RX gain with a first gain value for receiving data during a first period, and may employ the RX gain with a second gain value for receiving data during a second period, wherein the second gain value is smaller than the first gain value, the first period does not overlap any duration in which the TX circuit 106 of the wireless communication system 102 transmits data, and the second period overlaps a duration in which the TX circuit 106 of the wireless communication system 102 transmits data.

In addition, in accordance with the packet overlapping scenario under FDD, the control circuit 104 of the wireless communication system 102 may obtain the TX power control information INF_P (which is indicative of expected TX power) from the indicator information INF_RX provided by the wireless communication system 112. The TX circuit 106 of the wireless communication system 102 may employ TX power with a first power value for transmitting data during the first period, and may employ the TX power with a second power value (e.g., expected TX power) for transmitting data during the second period, wherein the second power value is smaller than the first power value. Hence, none of RX gain and TX power is reduced within a non-overlapping duration in which there is no in-device coexistence interference, and both of RX gain and TX power are reduced within an overlapping duration in which there is in-device coexistence interference. In this way, the RX throughput can be enhanced under FDD.

In this exemplary design, before a start time of the duration in which the TX circuit 106 performs data transmission and the RX circuit 118 performs data reception, the control circuit 104 of the wireless communication system 102 provides the indicator information INF_TX, and the control circuit 114 of the wireless communication system 112 obtains the indicator information INF_TX, where the indicator information INF_TX may include a TX power, a channel, a bandwidth, and a data arriving time (i.e., transmission timing).

As mentioned above, a control circuit of a first wireless communication system generates and sends indicator information (e.g., TX power, channel, bandwidth, and/or data arriving time) to a control circuit of a second wireless communication system, and the control circuit of the second wireless communication system generates control information (e.g., RX gain control information and/or TX power control information) according to the received indicator information. In some embodiments of the present invention, the control circuit of the second wireless communication system may determine a signal-to-noise ratio (SNR) degradation level that can be used for controlling generation of the control information (e.g., RX gain control information and/or TX power control information).

Figure 2:
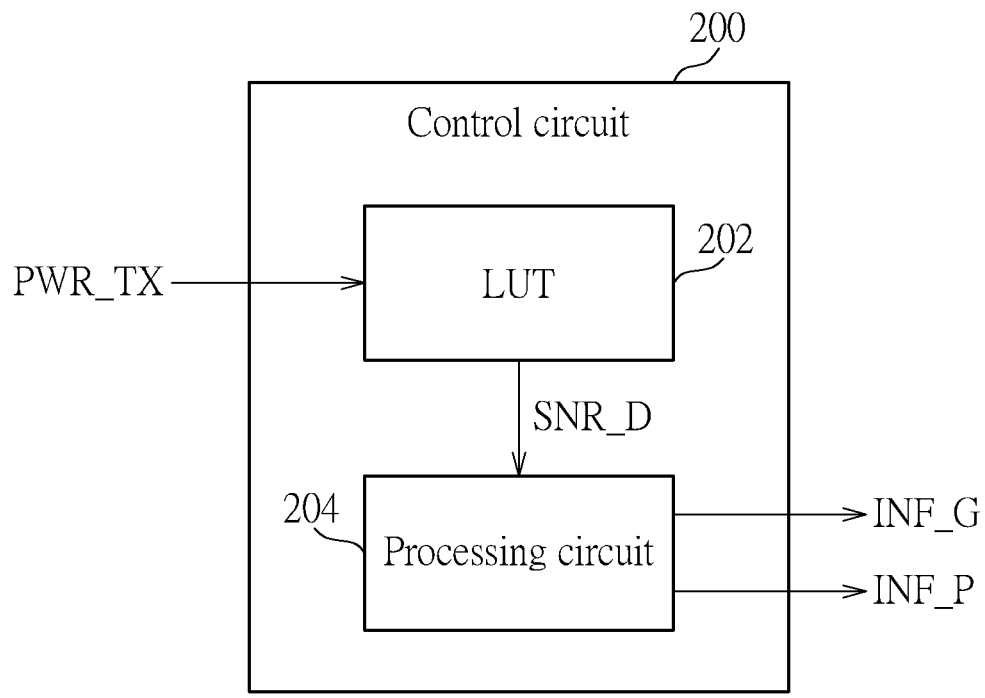
FIG. 2 is a diagram illustrating one design of a control circuit of a wireless communication system according to an embodiment of the present invention.

FIG. 2 is a diagram illustrating one design of a control circuit of a wireless communication system according to an embodiment of the present invention. The control circuit 104/114 of the wireless communication system 102/112 may be implemented using the control circuit 200. The control circuit 200 includes a lookup table (LUT) 202 and a processing circuit 204. The LUT 202 records a plurality of pre-defined SNR degradation levels mapped to a plurality of pre-defined TX power levels, respectively. After receiving a TX power level PWR_TX included in the indicator information INF_TX provided from another wireless communication system, the LUT 202 searches for an SNR degradation level SNR_D associated with the TX power level PWR_TX. The processing circuit 204 is coupled to the LUT 202, and is arranged to generate control information (e.g., RX gain control information INF_G and/or TX power control information INF_P) in response to the SNR degradation level SNR_D. For example, the processing circuit 204 may check if the SNR degradation level SNR_D is within a pre-defined range, and may enable generation of the control information (e.g., RX gain control information INF_G and/or TX power control information INF_P) when the SNR degradation level SNR_D is found within the pre-defined range.

With regard to the design shown in FIG. 2, a mapping table that includes a plurality of table entries, each recording mapping between one pre-defined SNR degradation level and one pre-defined TX power level, may be built by experiments in advance. However, this is for illustrative purposes only, and is not meant to be a limitation of the present invention.

Figure 3:
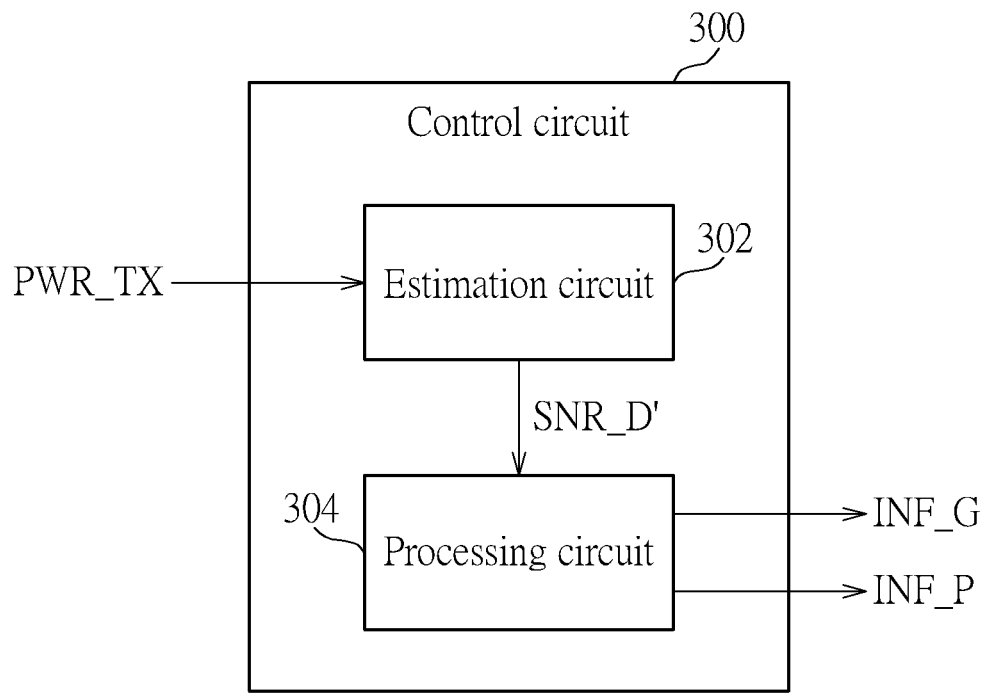
FIG. 3 is a diagram illustrating another design of a control circuit of a wireless communication system according to an embodiment of the present invention.

Alternatively, the SNR degradation level may be computed dynamically. FIG. 3 is a diagram illustrating another design of a control circuit of a wireless communication system according to an embodiment of the present invention. The control circuit 104/114 of the wireless communication system 102/112 may be implemented using the control circuit 300. The control circuit 300 includes an estimation circuit 302 and a processing circuit 304. Before a start time of a duration in which the wireless communication system (which includes the control circuit 300) performs data reception and another wireless communication system (which provides the indicator information) performs data transmission, the estimation circuit 302 estimates an SNR degradation level SNR_D' in a real-time manner. The processing circuit 304 is coupled to the estimation circuit 302, and is arranged to generate control information (e.g., RX gain control information INF_G and/or TX power control information INF_P) in response to the estimated SNR degradation level SNR_D'. For example, the processing circuit 304 may check if the estimated SNR degradation level SNR_D' is within a pre-defined range, and may enable generation of the control information (e.g., RX gain control information INF_G and/or TX power control information INF_P) when the estimated SNR degradation level SNR_D' is found within the pre-defined range.

Figure 4:
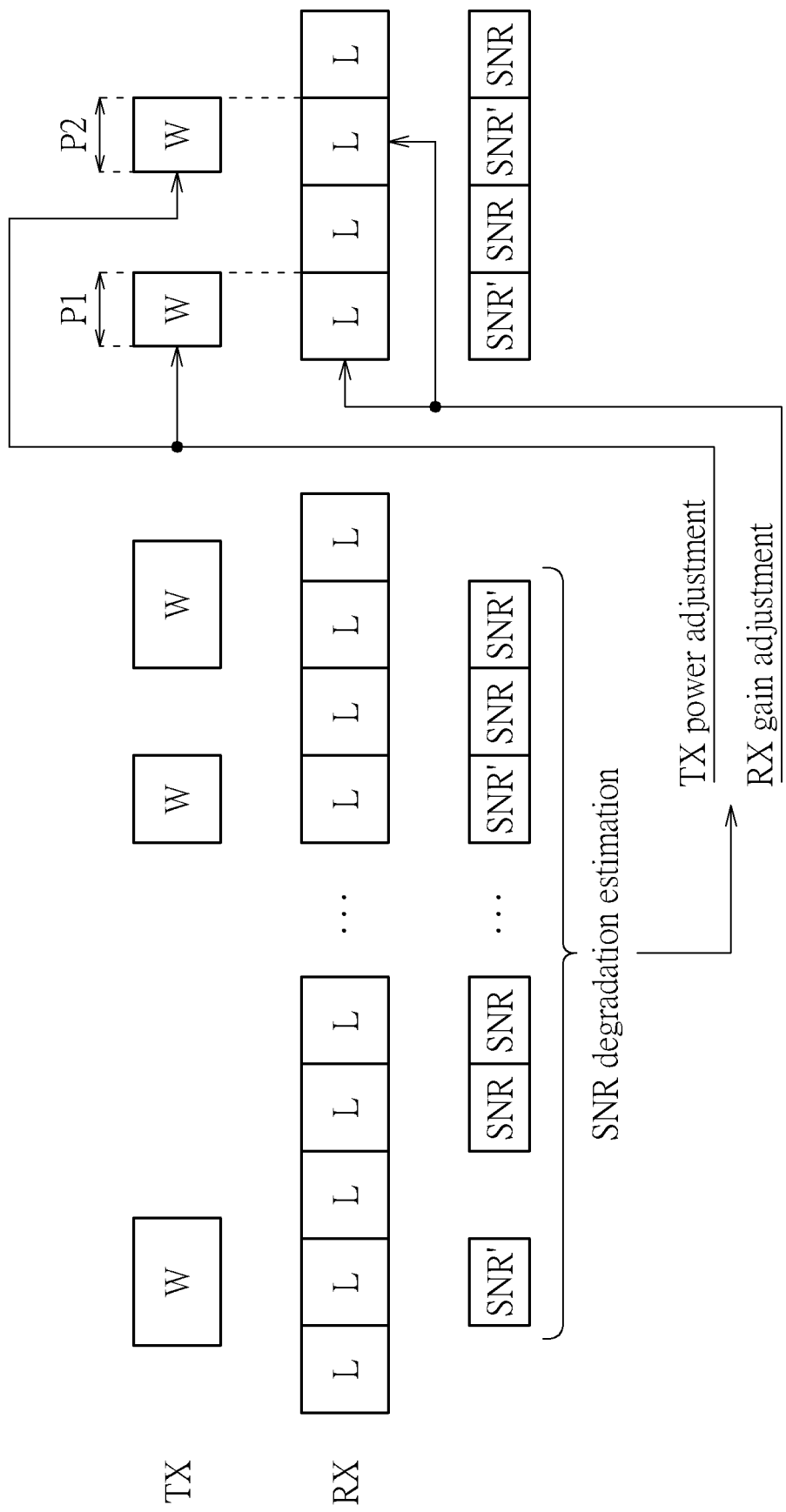
FIG. 4 is a diagram illustrating an example of dynamically adjusting receiver (RX) gain and transmitter (TX) power on the basis of signal-to-noise ratio (SNR) estimation according to an embodiment of the present invention.

FIG. 4 is a diagram illustrating an example of dynamically adjusting RX gain and TX power on the basis of SNR estimation according to an embodiment of the present invention. Suppose that the wireless communication system 102 is an LTE system, the wireless communication system 112 is a WiFi system, and the control circuit 104 is implemented by the control circuit 300. As shown in FIG. 4, some durations in which the TX circuit 116 outputs WiFi packets (labeled by W) overlap some durations in which the RX circuit 108 receives LTE subframes (labeled by S). Hence, packet overlapping scenario occurs at each of these overlapping durations. The control circuit 104 estimates SNR with WiFi interference to obtain first SNR values (labeled by SNR'), estimates SNR without WiFi interference to obtain second SNR values (labeled by SNR), and perform SNR degradation estimation according to first SNR values and second SNR values that are collected during a period of time. After an SNR degradation level is obtained, the control circuit 104 refers to the SNR degradation level to enable TX power adjustment and RX gain adjustment. During any of periods P1 and P2 in which the TX and RX packet delivery scenario is identified as a packet overlapping scenario, the TX circuit 116 may employ reduced TX power for transmitting one WiFi packet, and the RX circuit 108 may employ reduced RX gain for receiving one LTE subframe.

Furthermore, during a period in which the TX and RX packet delivery scenario is identified as a packet non-overlapping scenario, no TX power reduction is applied to the TX circuit 116 for transmitting WiFi packets due to the fact that WiFi packet transmission does not interfere with LTE subframe reception, and no RX gain reduction is applied to the RX circuit 108 for receiving LTE subframes due to the fact that LTE subframe reception is not interfered with WiFi packet transmission.

Figure 5:
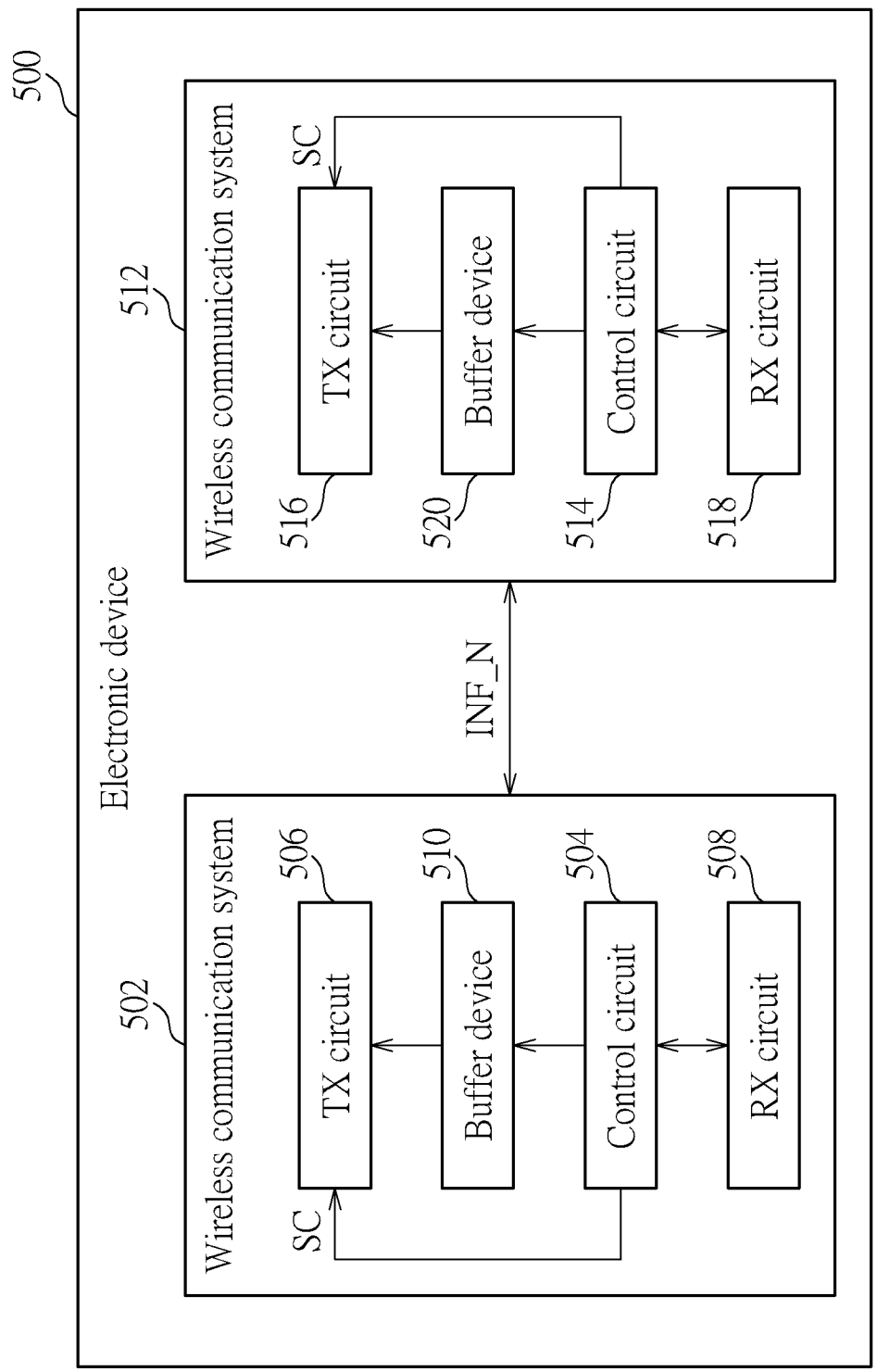
FIG. 5 is a diagram illustrating a second electronic device with coexistence of multiple wireless communication systems according to an embodiment of the present invention.

FIG. 5 is a diagram illustrating a second electronic device with coexistence of multiple wireless communication systems according to an embodiment of the present invention. For example, the electronic device 500 may be a mobile device such as a cellular phone. As shown in FIG. 5, the electronic device 500 includes wireless communication systems 502 and 512 that employ different wireless communication technologies.

For example, the wireless communication system 502 may be one of an LTE system, an NR system, a WiFi system, a ZigBee system, and a BT system; and the wireless communication system 512 may be another of the LTE system, the NR system, the WiFi system, the ZigBee system, and the BT system. The wireless communication system 502 includes a control circuit 504, a plurality of wireless communication circuits including a TX circuit 506 and an RX circuit 508, and a buffer device 510. The wireless communication system 512 includes a control circuit 514, a plurality of wireless communication circuits including a TX circuit 516 and an RX circuit 518, and a buffer device 520. For example, each of the buffer devices 510 and 520 may be implemented by an on-chip memory, an off-chip memory, or a combination of an on-chip memory and an off-chip memory.

In accordance with a second throughput enhancement technique proposed by the present invention, data transmission at one of the wireless communication systems 502 and 512 can be aggregated in a continuous period in which another of the wireless communication systems 502 and 512 performs data reception.

In a first exemplary design, the control circuit 504 of the wireless communication system 502 is arranged to obtain notification information INF_N provided from the control circuit 514 of the wireless communication system 512, aggregate a plurality of transmission data units (e.g., WiFi packets or LTE subframes) in the buffer device 510, and generate a control signal SC for instructing the TX circuit 506 to transmit the transmission data units stored in the buffer device 510 in a continuous period, where the continuous period overlaps a duration in which the RX circuit 518 of the wireless communication system 512 receives data. The notification information INF_N may be generated in response to interference detection periodically performed by the control circuit 514 of the wireless communication system 512. For example, the notification information INF_N may be indicative of occurrence of in-device coexistence interference.

Both of the wireless communication systems 502 and 512 may support the same throughput enhancement technique. In a second exemplary design, the control circuit 514 of the wireless communication system 512 is arranged to obtain notification information INF_N provided from the control circuit 504 of the wireless communication system 502, aggregate a plurality of transmission data units (e.g., WiFi packets or LTE subframes) in the buffer device 520, and generate a control signal SC for instructing the TX circuit 516 to transmit the transmission data units stored in the buffer device 520 in a continuous period, where the continuous period overlaps a duration in which the RX circuit 508 of the wireless communication system 502 receives data. The notification information INF_N may be generated in response to interference detection periodically performed by the control circuit 504 of the wireless communication system 502. For example, the notification information INF_N may be indicative of occurrence of in-device coexistence interference.

Figure 6:
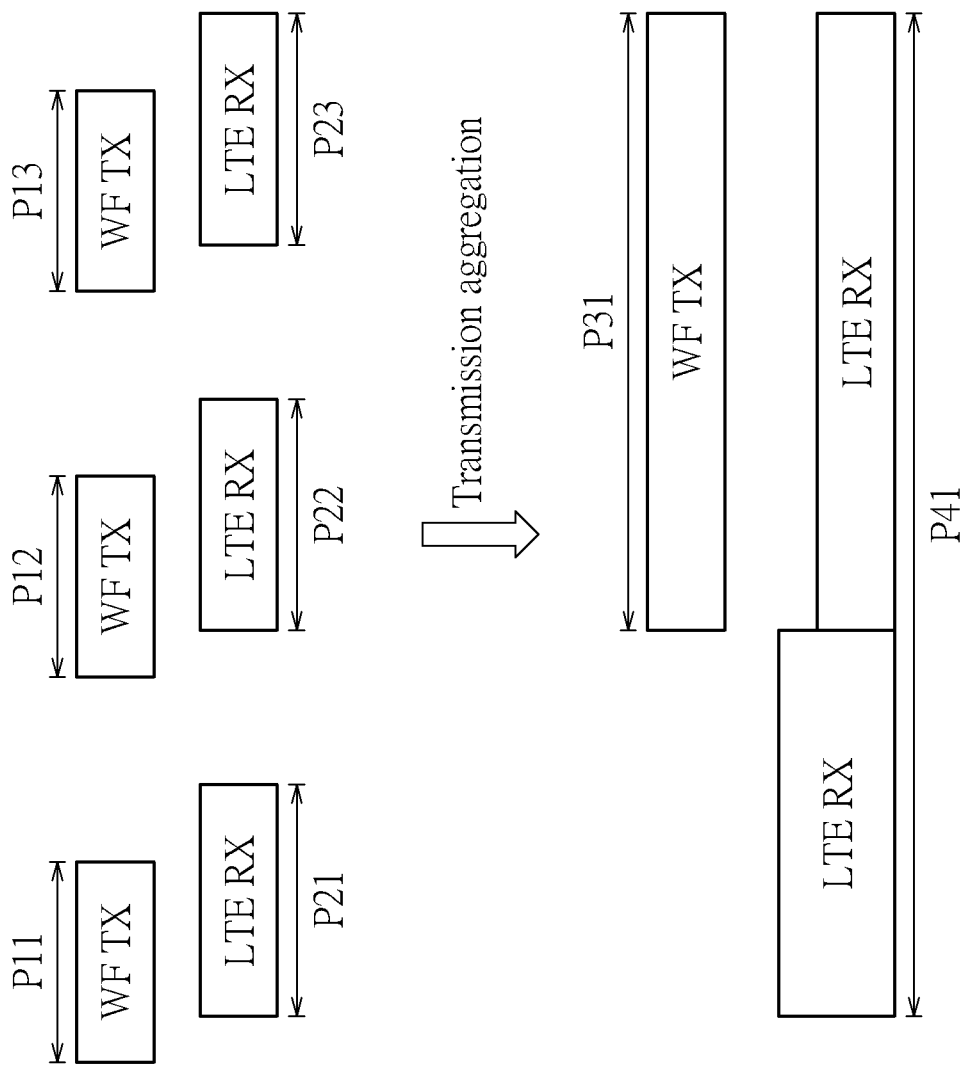
FIG. 6 is a diagram illustrating a concept of the second throughput enhancement technique according to an embodiment of the present invention.

FIG. 6 is a diagram illustrating a concept of the second throughput enhancement technique according to an embodiment of the present invention. Suppose that the wireless communication system 502 is an LTE system, and the wireless communication system 512 is a WiFi system. Reception of LTE subframes is interfered with transmission of WiFi packets due to in-device coexistence. The top part of FIG. 6 shows a communication scenario without proposed transmission aggregation. One continuous WiFi packet transmission is labeled by "WF TX". One continuous LTE subframe reception is labeled by "LTE RX". One WiFi packet is transmitted during each of periods P11, P12, and P13, where the period P11 is not immediately followed by the period P12, and the period P12 is not immediately followed by the period P13. One LTE subframe is received during each of periods P21, P22, and P23, where the period P21 overlaps the period P11, the period P22 overlaps the period P12, and the period P23 overlaps the period P13. Since the LTE subframe reception is interfered with WiFi packet transmission intermittently, the channel estimation performed at the LTE receiver side may be less accurate. To increase the channel estimation accuracy for data reception, the present invention proposes aggregating the data transmission in a continuous period.

The bottom part of FIG. 6 shows a communication scenario with proposed transmission aggregation. The LTE subframe reception is performed in a continuous period P41. In addition, the WiFi packet transmission is performed in a continuous period P31 that is a part of the continuous period P41. The transmission of multiple WiFi packets is aggregated in the continuous period P31. Since the LTE subframe reception during the period P31 is interfered with WiFi packet transmission continuously, more accurate channel estimation can be achieved for the LTE subframe reception during the period P31, and thus the LTE subframe reception during the period P31 can have stable throughput.

As mentioned above, the control circuit 504/514 generates the control signal SC for instructing the TX circuit 506/516 to transmit the transmission data units stored in the buffer device 510/520 in a continuous period. In some embodiments of the present invention, a buffer size and/or a transmission rate may be considered to determine the timing of generating the control signal SC.

In a first exemplary design, the control circuit 504/514 generates a checking result by determining if a data amount of transmission data units in the buffer device 510/520 reaches a predetermined threshold, and refers to the checking result for determining whether to instruct the TX circuit 506/516 to transmit the transmission data units in the buffer device 510/520. For example, the TX circuit 506/516 does not start transmitting the transmission data units in the buffer device 510/520 unless the buffer device 510/520 is full or almost full. The buffer size of the buffer device 510/520 can be used to check fullness of the buffer device 510/520.

In a second exemplary design, the control circuit 504/514 generates a checking result by determining if a transmission duration of transmission data units in the buffer device 510/520 reaches a predetermined threshold, and refers to the checking result for determining whether to instruct the TX circuit 506/516 to transmit the transmission data units in the buffer device 510/520. For example, the TX circuit 506/516 does not start transmitting the transmission data units in the buffer device 510/520 unless the transmission duration of the transmission data units in the buffer device 510/520 is long enough. The transmission rate selected by the TX circuit 506/516 can be used to estimate the transmission duration of transmission data units in the buffer device 510/520.

Figure 7:
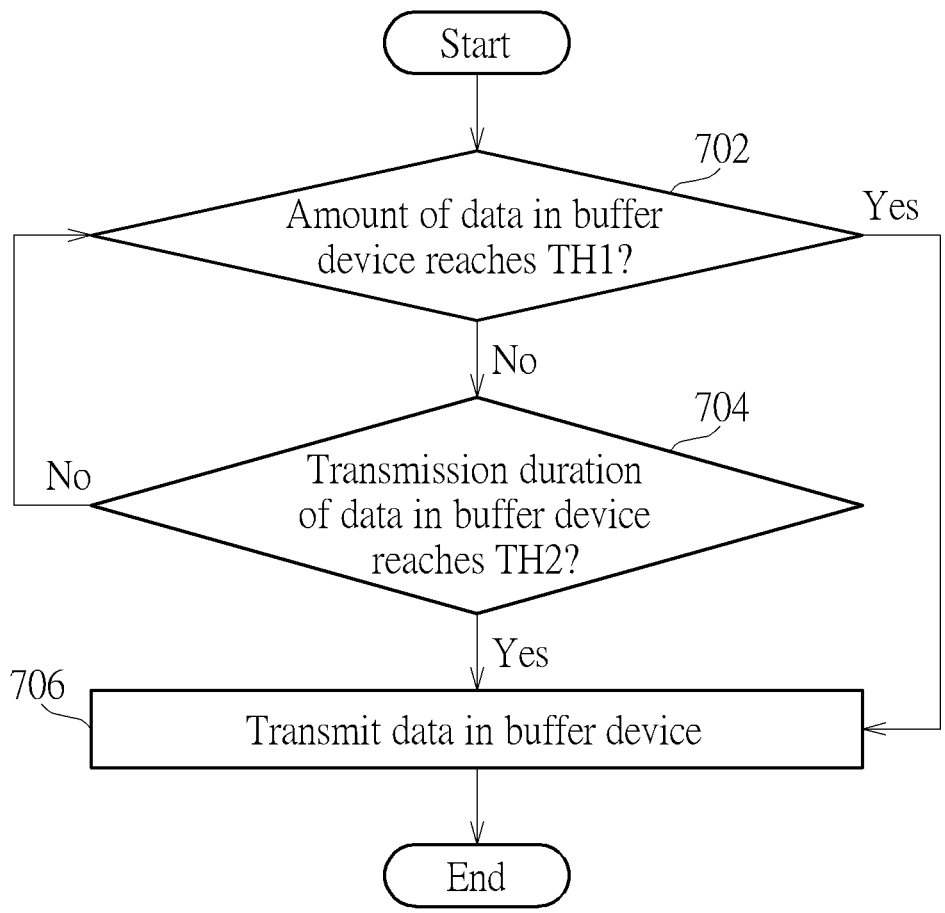
FIG. 7 is a flowchart illustrating a control method of data transmission aggregation according to an embodiment of the present invention.

In a third exemplary design, the buffer size and the transmission rate may be jointly considered. FIG. 7 is a flowchart illustrating a control method of data transmission aggregation according to an embodiment of the present invention. Provided that the result is substantially the same, the steps are not required to be executed in the exact order. At step 702, the control circuit 504/514 generates a first checking result by determining if a data amount of transmission data units in the buffer device 510/520 reaches a first predetermined threshold TH1. When the first checking result indicates that the data amount of transmission data units in the buffer device 510/520 reaches the first predetermined threshold TH1, the control circuit 504/514 instructs the TX circuit 506/516 to start transmitting the transmission data units in the buffer device 510/520 (Step 706).

When the first checking result indicates that the data amount of transmission data units in the buffer device 510/520 does not reach the first predetermined threshold TH1 yet, the control circuit 504/514 further generates a second checking result by determining if a transmission duration of transmission data units aggregated in the buffer device 510/520 reaches a second predetermined threshold TH2 (Step 704). When the second checking result indicates that the transmission duration of transmission data units in the buffer device 510/520 reaches the second predetermined threshold TH2, the control circuit 504/514 instructs the TX circuit 506/516 to transmit the transmission data units in the buffer device 510/520 (Step 706). When the second checking result indicates that the transmission duration of transmission data units in the buffer device 510/520 does not reach the second predetermined threshold TH2 yet, the flow proceeds with step 702 to keep monitoring a buffer status of the buffer device 510/520.

Figure 8:
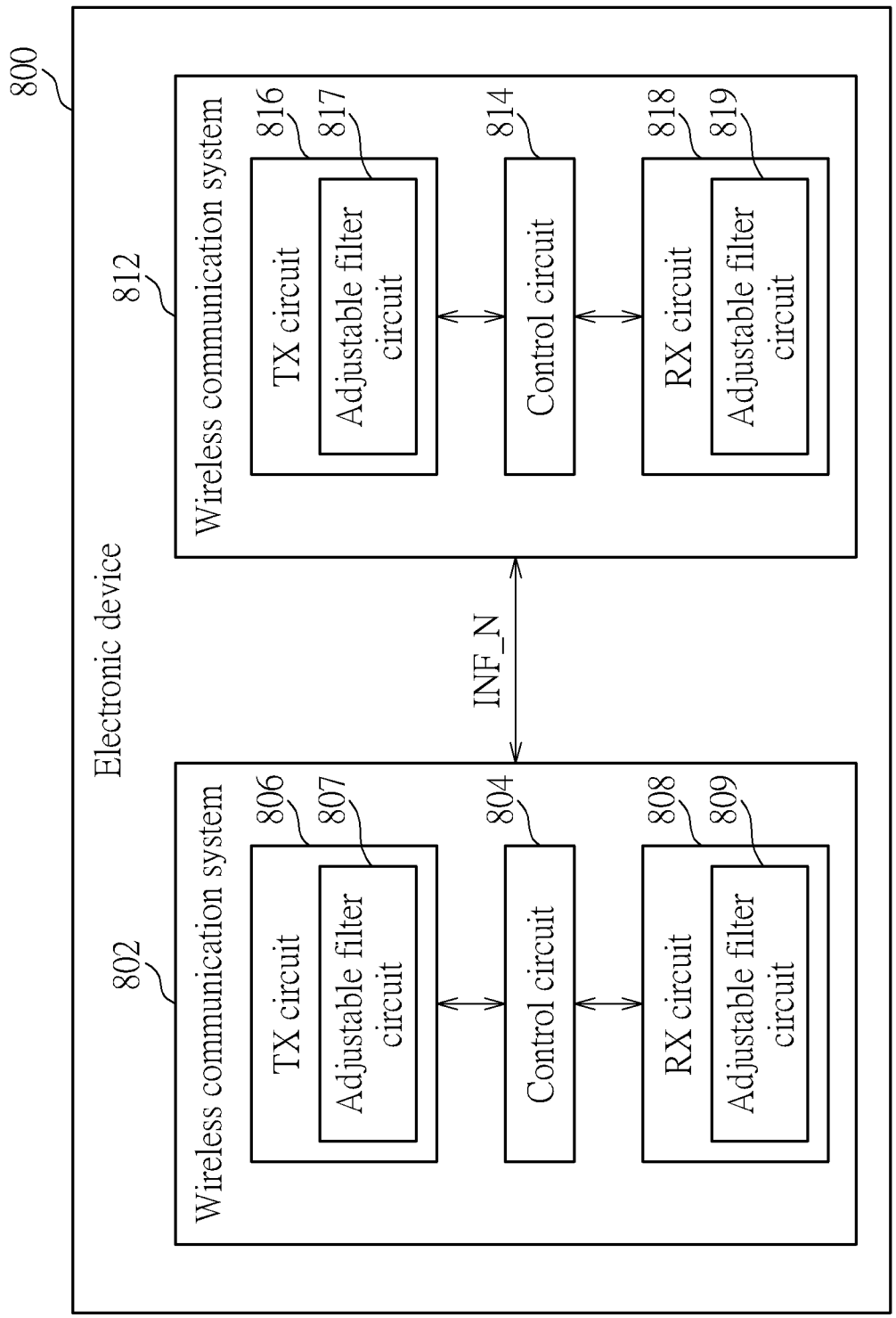
FIG. 8 is a diagram illustrating a third electronic device with coexistence of multiple wireless communication systems according to an embodiment of the present invention.

FIG. 8 is a diagram illustrating a third electronic device with coexistence of multiple wireless communication systems according to an embodiment of the present invention. For example, the electronic device 800 may be a mobile device such as a cellular phone. As shown in FIG. 8, the electronic device 800 includes wireless communication systems 802 and 812 that employ different wireless communication technologies. For example, the wireless communication system 802 may be one of an LTE system, an NR system, a WiFi system, a ZigBee system, and a BT system; and the wireless communication system 812 may be another of the LTE system, the NR system, the WiFi system, the ZigBee system, and the BT system.

The wireless communication system 802 includes a control circuit 804 and a plurality of wireless communication circuits including a TX circuit 806 and an RX circuit 808, where the TX circuit 806 includes an adjustable filter circuit (e.g., analog bandpass filter) 807 that is a part of a TX chain and is used for filtering a radio-frequency signal to be transmitted, and the RX circuit 808 includes an adjustable filter circuit (e.g., analog bandpass filter) 809 that is a part of an RX chain and is used for filtering a received radio-frequency signal. The wireless communication system 812 includes a control circuit 814 and a plurality of wireless communication circuits including a TX circuit 816 and an RX circuit 818, where the TX circuit 816 includes an adjustable filter circuit (e.g., analog bandpass filter) 817 that is a part of a TX chain and is used for filtering a radio-frequency signal to be transmitted, and the RX circuit 818 includes an adjustable filter circuit (e.g., analog bandpass filter) 819 that is a part of an RX chain and is used for filtering a received radio-frequency signal.

In accordance with a third throughput enhancement technique proposed by the present invention, TX filter response and/or RX filter response can be adjusted to remove interference outside the channel bandwidth under FDD.

In a first exemplary design, the control circuit 804 of the wireless communication system 802 is arranged to configure the adjustable filter circuit 807 to have a first filter response when a TX channel employed by the TX circuit 806 for data transmission and an RX channel employed by the RX circuit 818 for data reception have a first channel arrangement, and configure the adjustable filter circuit 807 to have a second filter response (which is different from the first filter response) when the TX channel employed by the TX circuit 806 for data transmission and the RX channel employed by the RX circuit 818 for data reception have a second channel arrangement. For example, the first channel arrangement and the second channel arrangement may differ in channel location and/or channel distance. In some embodiments of the present invention, the control circuit 814 of the wireless communication system 812 may generate the notification information INF_N to notify the control circuit 804 of the RX channel employed by the RX circuit 818.

In a second exemplary design, the control circuit 804 of the wireless communication system 802 is arranged to configure the adjustable filter circuit 807 to have a first filter response when a TX channel employed by the TX circuit 806 for data transmission and an RX channel employed by the RX circuit 818 for data reception have a first channel arrangement, and configure the adjustable filter circuit 807 to have a second filter response (which is different from the first filter response) when the TX channel employed by the TX circuit 806 for data transmission and the RX channel employed by the RX circuit 818 for data reception have a second channel arrangement. In addition, the control circuit 814 of the wireless communication system 812 is arranged to configure the adjustable filter circuit 819 to have a third filter response when the TX channel employed by the TX circuit 806 for data transmission and the RX channel employed by the RX circuit 818 for data reception have the first channel arrangement, and configure the adjustable filter circuit 819 to have a fourth filter response (which is different from the third filter response) when the TX channel employed by the TX circuit 806 for data transmission and the RX channel employed by the RX circuit 818 for data reception have the second channel arrangement.

For example, the first channel arrangement and the second channel arrangement may differ in channel location and/or channel distance. In some embodiments of the present invention, the control circuit 814 of the wireless communication system 812 may generate the notification information INF_N to notify the control circuit 804 of the RX channel employed by the RX circuit 818, and the control circuit 804 of the wireless communication system 802 may generate the notification information INF_N to notify the control circuit 814 of the TX channel employed by the TX circuit 806.

Both of the wireless communication systems 802 and 812 may support the same throughput enhancement technique. In a third exemplary design, the control circuit 814 of the wireless communication system 812 is arranged to configure the adjustable filter circuit 817 to have a first filter response when a TX channel employed by the TX circuit 816 for data transmission and an RX channel employed by the RX circuit 808 for data reception have a first channel arrangement, and configure the adjustable filter circuit 817 to have a second filter response (which is different from the first filter response) when the TX channel employed by the TX circuit 816 for data transmission and the RX channel employed by the RX circuit 808 for data reception have a second channel arrangement. For example, the first channel arrangement and the second channel arrangement may differ in channel location and/or channel distance. In some embodiments of the present invention, the control circuit 804 of the wireless communication system 802 may generate the notification information INF_N to notify the control circuit 814 of the RX channel employed by the RX circuit 808.

In a fourth exemplary design, the control circuit 814 of the wireless communication system 812 is arranged to configure the adjustable filter circuit 817 to have a first filter response when a TX channel employed by the TX circuit 816 for data transmission and an RX channel employed by the RX circuit 808 for data reception have a first channel arrangement, and configure the adjustable filter circuit 817 to have a second filter response (which is different from the first filter response) when the TX channel employed by the TX circuit 816 for data transmission and the RX channel employed by the RX circuit 808 for data reception have a second channel arrangement.

In addition, the control circuit 804 of the wireless communication system 802 is arranged to configure the adjustable filter circuit 809 to have a third filter response when the TX channel employed by the TX circuit 816 for data transmission and the RX channel employed by the RX circuit 808 for data reception have the first channel arrangement, and configure the adjustable filter circuit 809 to have a fourth filter response (which is different from the third filter response) when the TX channel employed by the TX circuit 816 for data transmission and the RX channel employed by the RX circuit 808 for data reception have the second channel arrangement.

For example, the first channel arrangement and the second channel arrangement may differ in channel location and/or channel distance. In some embodiments of the present invention, the control circuit 804 of the wireless communication system 802 may generate the notification information INF_N to notify the control circuit 814 of the RX channel employed by the RX circuit 808, and the control circuit 814 of the wireless communication system 812 may generate the notification information INF_N to notify the control circuit 804 of the TX channel employed by the TX circuit 816.

Figure 9:
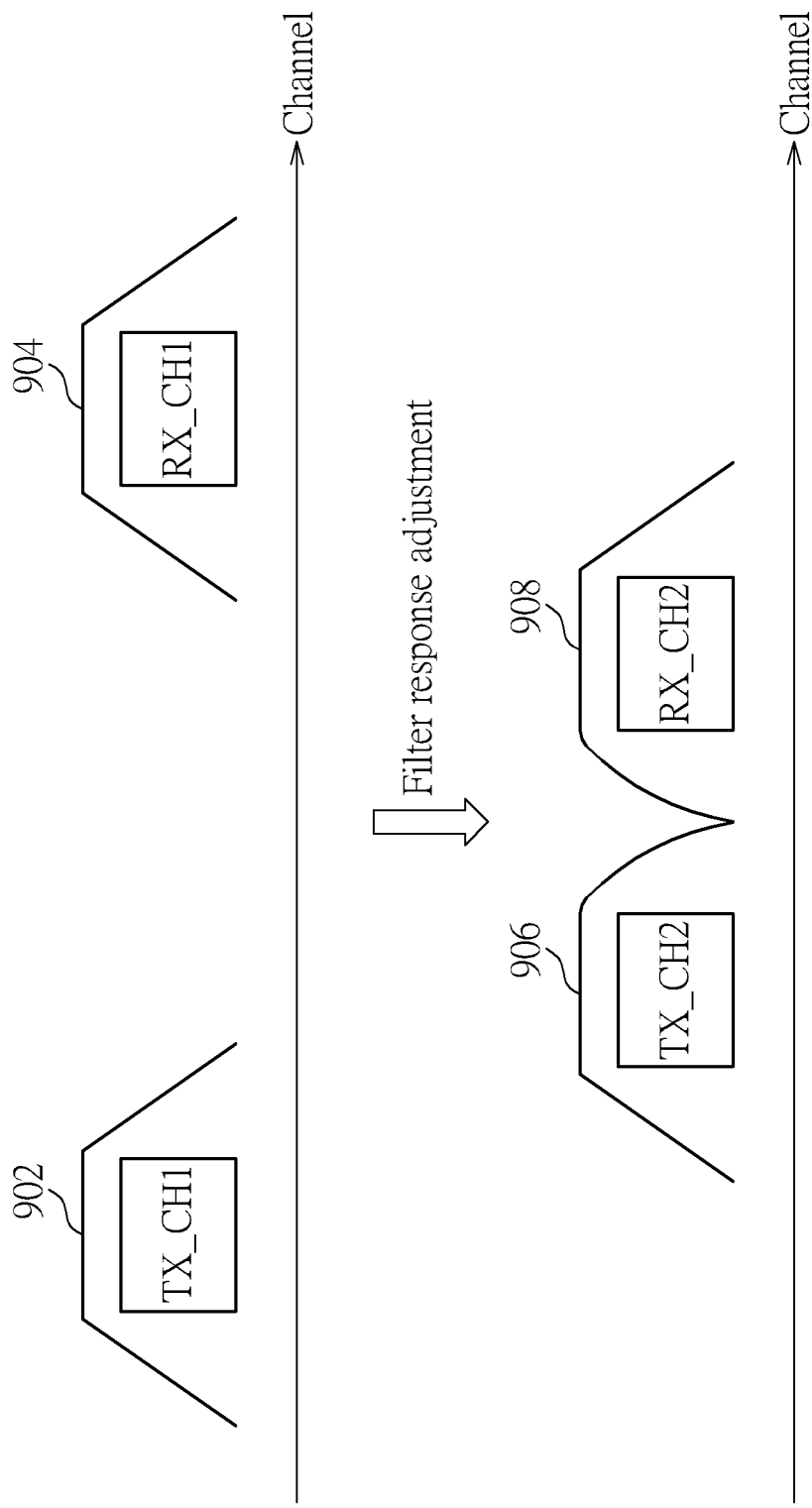
FIG. 9 is a diagram illustrating a concept of the third throughput enhancement technique according to an embodiment of the present invention.

FIG. 9 is a diagram illustrating a concept of the third throughput enhancement technique according to an embodiment of the present invention. The top part of FIG. 9 shows a communication scenario without proposed filter response adjustment. Under an FDD mode, a TX chain of one wireless communication system selects a TX channel TX_CH1 for data transmission and an RX chain of another wireless communication system selects an RX channel RX_CH1 for data reception. For example, in accordance with the TX and RX channel location, an adjustable filter circuit used by the TX chain of one wireless communication system is configured to have a filter response 902, and an adjustable filter circuit used by the RX chain of another wireless communication system is configured to have a filter response 904. For another example, an adjustable filter circuit used by the TX chain of one wireless communication system is configured to have the filter response 902 and an adjustable filter circuit used by the RX chain of another wireless communication system is configured to have the filter response 904, if the channel distance between the TX channel TX_CH1 and the RX channel RX_CH1 is large. The interference outside the TX/RX channel bandwidth can be filtered out by the adjustable filter circuit in the TX/RX chain.

The bottom part of FIG. 9 shows a communication scenario with proposed filter response adjustment. Under an FDD mode, a TX chain of one wireless communication system selects a TX channel TX_CH2 for data transmission and an RX chain of another wireless communication system selects an RX channel RX_CH2 for data reception. For example, in accordance with the TX and RX channel location, an adjustable filter circuit used by the TX chain of one wireless communication system is configured to have a filter response 906 that is different from the filter response 902, and an adjustable filter circuit used by the RX chain of another wireless communication system is configured to have a filter response 908 that is different from the filter response 904. For another example, an adjustable filter circuit used by the TX chain of one wireless communication system is configured to have the filter response 906 that is different from the filter response 902 and an adjustable filter circuit used by the RX chain of another wireless communication system is configured to have the filter response 908 that is different from the filter response 904, if the channel distance between the TX channel TX_CH2 and the RX channel RX_CH2 is small. The interference outside the TX/RX channel bandwidth can be filtered out by the adjustable filter circuit in the TX/RX chain. With proper filter response adjustment, in-device coexistence interference can be mitigated.

It should be noted that the aforementioned first throughput enhancement technique, second throughput enhancement technique and third throughput enhancement technique can be used individually or jointly. In one exemplary implementation, a wireless communication system may employ one of the first throughput enhancement technique, the second throughput enhancement technique and the third throughput enhancement technique. In another exemplary implementation, a wireless communication system may employ two of the first throughput enhancement technique, the second throughput enhancement technique and the third throughput enhancement technique. In yet another exemplary implementation, a wireless communication system may employ all of the first throughput enhancement technique, the second throughput enhancement technique and the third throughput enhancement technique.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication system comprising:
a control circuit, arranged to obtain indicator information from another wireless communication system, identify a transmitter (TX) and receiver (RX) packet delivery scenario as one of a packet overlapping scenario and a packet non-overlapping scenario according to the indicator information, and generate RX gain control information in response to the TX and RX packet delivery scenario; and
an RX circuit, arranged to refer to the RX gain control information to set an RX gain used for receiving data;
wherein the RX circuit receives data in a first period, said another wireless communication system transmits data in a duration, the TX and RX packet delivery scenario identified according to the indicator information indicates that the first period overlaps the duration; and the control circuit obtains a signal-to-noise ratio (SNR) degradation level, checks if the SNR degradation level is within a pre-defined range, and enables generation of the RX gain control information when the SNR degradation level is found within the pre-defined range.

2. The wireless communication system of claim 1, wherein the wireless communication system and said another wireless communication system coexist in a same electronic device.

3. The wireless communication system of claim 1, wherein the RX circuit employs the RX gain with a first gain value for receiving data during a second period, and employs the RX gain with a second gain value for receiving data during the first period, where the second gain value is smaller than the first gain value.

4. The wireless communication system of claim 3, wherein the indicator information comprises a data arriving time.

5. The wireless communication system of claim 3, wherein the indicator information comprises a transmitter (TX) power level, and the control circuit comprises:
a lookup table, arranged to search for the SNR degradation level associated with the TX power level, wherein the lookup table records a plurality of pre-defined SNR degradation levels mapped to a plurality of pre-defined TX power levels, respectively; and
a processing circuit, arranged to generate the RX gain control information in response to the SNR degradation level.

6. The wireless communication system of claim 3, wherein the control circuit comprises:
an estimation circuit, wherein before a start time of the duration, the estimation circuit estimates the SNR degradation level in a real-time manner; and
a processing circuit, arranged to generate the RX gain control information in response to the estimated SNR degradation level;
wherein the control circuit estimates SNR with interference to obtain first SNR values, estimates SNR without interference to obtain second SNR values, and estimates the SNR degradation level by performing SNR degradation estimation according to the first SNR values and the second SNR values.

7. The wireless communication system of claim 1, wherein the control circuit is further arranged to generate and output another indicator information to said another wireless communication system in response to the TX and RX packet delivery scenario, where said another indicator information indicates that the RX circuit is receiving data, and comprises TX power control information.

8. The wireless communication system of claim 1, wherein the wireless communication system is a Long-Term Evolution (LTE) system, a New Radio (NR) system, a Wireless Fidelity (WiFi) system, a ZigBee system, or a Bluetooth (BT) system.

9. A wireless communication system comprising:
a control circuit, arranged to identify a transmitter (TX) and receiver (RX) packet delivery scenario as one of a packet overlapping scenario and a packet non-overlapping scenario, and determine TX power control information in response to the TX and RX packet delivery scenario; and
a TX circuit, arranged to refer to the TX power control information to set TX power used for transmitting data;
wherein the control circuit obtains indicator information from another wireless communication system, and the indicator information comprises the TX power control information which is indicative of expected TX power of the TX circuit of the wireless communication system;
wherein the TX circuit employs TX power with a first power value for transmitting data during a first period, and employs the TX power with a second power value for transmitting data during a second period, where the second power value is smaller than the first power value, and the TX power with the second power value is set by the expected TX power that is indicated by said another wireless communication system; and the TX and RX packet delivery scenario indicates that the second period overlaps a duration in which said another wireless communication system receives data.

10. The wireless communication system of claim 9, wherein the wireless communication system and said another wireless communication system coexist in a same electronic device.

11. The wireless communication system of claim 9, wherein the control circuit identifies the TX and RX packet delivery scenario according to the indicator information.

12. The wireless communication system of claim 11, wherein the control circuit is further arranged to generate and output another indicator information to said another wireless communication system before a start time of the duration.

13. The wireless communication system of claim 12, wherein said another indicator information comprises at least the TX power.

14. The wireless communication system of claim 9, wherein the wireless communication system is a Long-Term Evolution (LTE) system, a New Radio (NR) system, a Wireless Fidelity (WiFi) system, a ZigBee system, or a Bluetooth (BT) system.

15. A wireless communication system comprising:
a buffer device;
a transmitter (TX) circuit; and
a control circuit, arranged to aggregate a plurality of transmission data units in the buffer device, and instruct the TX circuit to transmit the transmission data units in a continuous period, wherein the continuous period overlaps a duration in which another wireless communication system receives data;
wherein the control circuit generates a first checking result by determining if a transmission duration needed to transmit the transmission data units aggregated in the buffer device reaches a predetermined threshold, and refers to the first checking result for determining whether to instruct the TX circuit to transmit the transmission data units; a transmission rate selected by the TX circuit is used by the control circuit to estimate the transmission duration; and when the first checking result indicates that the transmission duration needed to transmit the transmission data units aggregated in the buffer device does not reach the predetermined threshold yet, the control circuit keeps checking if the transmission duration needed to transmit the transmission data units aggregated in the buffer device reaches the predetermined threshold.

16. The wireless communication system of claim 15, wherein the wireless communication system and said another wireless communication system coexist in a same electronic device.

17. The wireless communication system of claim 15, wherein the control circuit further generates a second checking result by determining if a data amount of the transmission data units aggregated in the buffer device reaches a predetermined threshold, and refers to the second checking result for determining whether to instruct the TX circuit to transmit the transmission data units.

18. The wireless communication system of claim 15, wherein the wireless communication system is a Long-Term Evolution (LTE) system, a New Radio (NR) system, a Wireless Fidelity (WiFi) system, a ZigBee system, or a Bluetooth (BT) system.

19. A wireless communication system comprising:
a wireless communication circuit, comprising an adjustable filter circuit; and
a control circuit, arranged to configure the adjustable filter circuit to have a first filter response when a first channel employed by the wireless communication circuit of the wireless communication system and a second channel employed by another wireless communication system have a first channel arrangement, and configure the adjustable filter circuit to have a second filter response when the first channel employed by the wireless communication circuit of the wireless communication system and the second channel employed by said another wireless communication system have a second channel arrangement;
wherein one of the first channel and the second channel is a transmitter (TX) channel, and another of the first channel and the second channel is a receiver (RX) channel; the first channel arrangement and the second channel arrangement differ in channel location or channel distance; the adjustable filter circuit does not have the second filter response when the first channel employed by the wireless communication circuit of the wireless communication system and the second channel employed by said another wireless communication system have the first channel arrangement; and the adjustable filter circuit does not have the first filter response when the first channel employed by the wireless communication circuit of the wireless communication system and the second channel employed by said another wireless communication system have the second channel arrangement.

20. The wireless communication system of claim 19, wherein the wireless communication system and said another wireless communication system coexist in a same electronic device.

21. The wireless communication system of claim 19, wherein the wireless communication system is a Long-Term Evolution (LTE) system, a New Radio (NR) system, a Wireless Fidelity (WiFi) system, a ZigBee system, or a Bluetooth (BT) system.

* * * * *